United States Patent
Lee et al.

(10) Patent No.: US 7,800,653 B2
(45) Date of Patent: Sep. 21, 2010

(54) SYSTEMS AND METHODS FOR COMPENSATING SIGNAL DRIFT ACCORDING TO A CALCULATED ABSOLUTE DIFFERENCE VALUE

(75) Inventors: Yu-Ting Lee, Taichung (TW); Chih-Hung Yang, Taichung (TW)

(73) Assignee: Asia Optical Co., Inc., Taichung (TW)

( * ) Notice: Subject to any disclaimer, the term of this patent is extended or adjusted under 35 U.S.C. 154(b) by 613 days.

(21) Appl. No.: 11/774,018

(22) Filed: Jul. 6, 2007

(65) Prior Publication Data

US 2007/0255533 A1 Nov. 1, 2007

Related U.S. Application Data

(63) Continuation-in-part of application No. 10/799,896, filed on Mar. 15, 2004, now abandoned.

(30) Foreign Application Priority Data

Jul. 26, 2006 (TW) .............................. 95127274 A

(51) Int. Cl.
*H04N 5/228* (2006.01)

(52) U.S. Cl. ................................. 348/208.99

(58) Field of Classification Search ............. 348/208.99
See application file for complete search history.

(56) References Cited

U.S. PATENT DOCUMENTS

| 5,617,177 A | 4/1997 | Imafuji et al. |
| 5,878,286 A | 3/1999 | Tomita et al. |
| 2004/0081441 A1* | 4/2004 | Sato et al. ..................... 396/52 |

* cited by examiner

*Primary Examiner*—Jason Chan
*Assistant Examiner*—Usman Khan
(74) *Attorney, Agent, or Firm*—Thomas, Kayden, Horstemeyer & Risley

(57) ABSTRACT

Signal compensation systems and methods. The system comprises a sensor and a processing module. The sensor detects movements of a camera device to generate sensed signals. The processing module acquires a relative maximum value and a relative minimum value of the sensed signals, and calculates an absolute difference accordingly. The absolute difference is the absolute value of the relative maximum value added the relative minimum value. The processing module determines whether the absolute difference exceeds a predetermined value. If so, the sensed signals are identified with a drift, and compensated according to the absolute difference.

16 Claims, 6 Drawing Sheets

SYSTEMS AND METHODS FOR COMPENSATING SIGNAL DRIFT ACCORDING TO A CALCULATED ABSOLUTE DIFFERENCE VALUE

BACKGROUND OF THE INVENTION

1. Field of the Invention

The disclosure relates generally to signal compensation systems and methods, and, more particularly to systems and methods that determine whether signals drift for sensors such as tilt sensors, and compensate correspondingly.

2. Description of the Related Art

Recently, digital cameras have become commonplace, due to ease of review and processing of captured images in related devices such as computers.

Vibration occurs in all cameras, particularly in digital cameras with light and thin volume. Since handheld stability is often insufficient, the camera can experience unsteadiness prior to or at the moment of image capture, resulting in image blur. Thus, anti-vibration mechanisms are always provided in digital cameras. Anti-vibration mechanisms disclosed in U.S. Pat. Nos. 5,878,286 and 5,617,177 employ an angular velocity sensor such as a gyro sensor to detect slight movements. A processor of a camera device calculates a compensation value according to the detected data, and enables a group of compensation lenses to compensate the vibration and avoid generating blurred images.

A sensor such as an angular velocity sensor continuously detects angle variations of movements of a camera device, the detected signals representing angular velocity variations are shown in FIG. 1, wherein the angular velocity (ω) variations are sine wave variations with the O-axis baseline. However, most sensors experience temperature drift. For example, if environmental temperature changes, the output detected signals may be different even under the same settings, reducing the accuracy of sensors. FIG. 2 illustrates detected signals of an angular velocity sensor with temperature drift. As shown in FIG. 2, the angular velocity variations have a temperature drift C away from the O-axis baseline, resulting in detected data inaccuracy.

BRIEF SUMMARY OF THE INVENTION

Signal compensation systems and methods are provided.

An embodiment of a signal compensation system comprises a sensor and a processing module. The sensor detects movements of a camera device to generate sensed signals. The processing module acquires a relative maximum value and a relative minimum value of the sensed signals, and calculates an absolute difference accordingly. The absolute difference is the absolute value of the relative maximum value added the relative minimum value. The processing module determines whether the absolute difference exceeds a predetermined value. If so, the sensed signals are identified with a drift, and compensated according to the absolute difference.

In an embodiment of a signal compensation method, sensed signals are obtained, in which the sensed signal indicates movements of a camera device. A relative maximum value and a relative minimum value of the sensed signals are acquired, and an absolute difference is calculated accordingly. The absolute difference is the absolute value of the relative maximum value added the relative minimum value. It is determined whether the absolute difference exceeds a predetermined value. If so, the sensed signals are identified with a drift, and compensated according to the absolute difference.

In an embodiment of a signal compensation method, sensed signals are obtained. A relative maximum value and a relative minimum value of the sensed signals are acquired, and an absolute difference is calculated accordingly. The absolute difference is the absolute value of the relative maximum value added the relative minimum value. It is determined whether the absolute difference exceeds a predetermined value. If so, the sensed signals are identified with a drift, and compensated according to the absolute difference.

Signal compensation systems and methods may take the form of program code embodied in a tangible media. When the program code is loaded into and executed by a machine, the machine becomes an apparatus for practicing the disclosed method.

BRIEF DESCRIPTION OF THE DRAWINGS

The invention will become more fully understood by referring to the following detailed description with reference to the accompanying drawings, wherein.

DETAILED DESCRIPTION OF THE INVENTION

Signal compensation systems and methods are provided.

Figure 1:
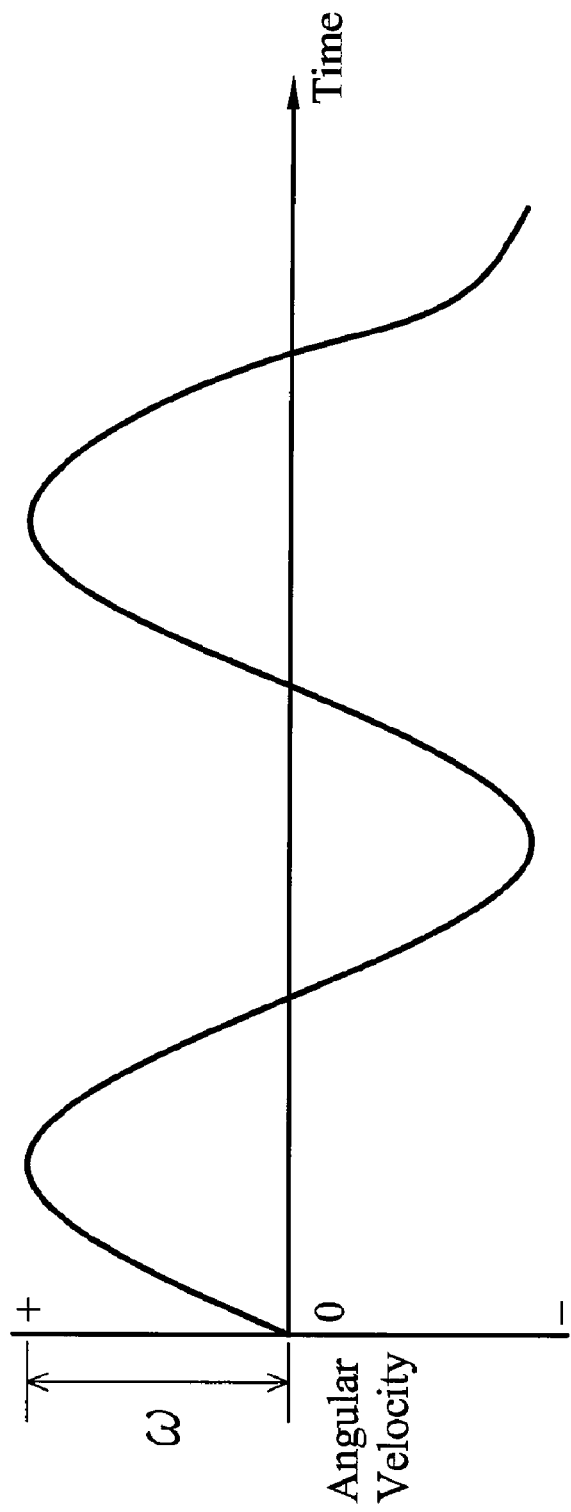
FIG. 1 is a schematic diagram illustrating sensed signals of an angular velocity sensor.
Figure 2:
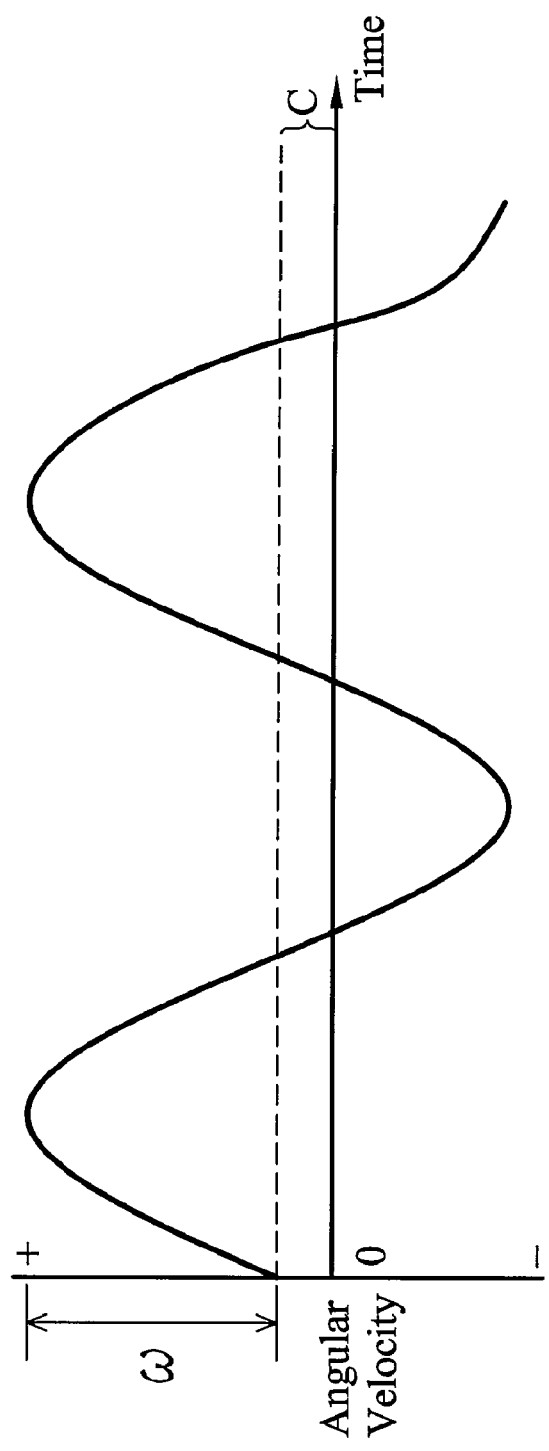
FIG. 2 is a schematic diagram illustrating sensed signals of an angular velocity sensor with temperature drift.
Figure 3:
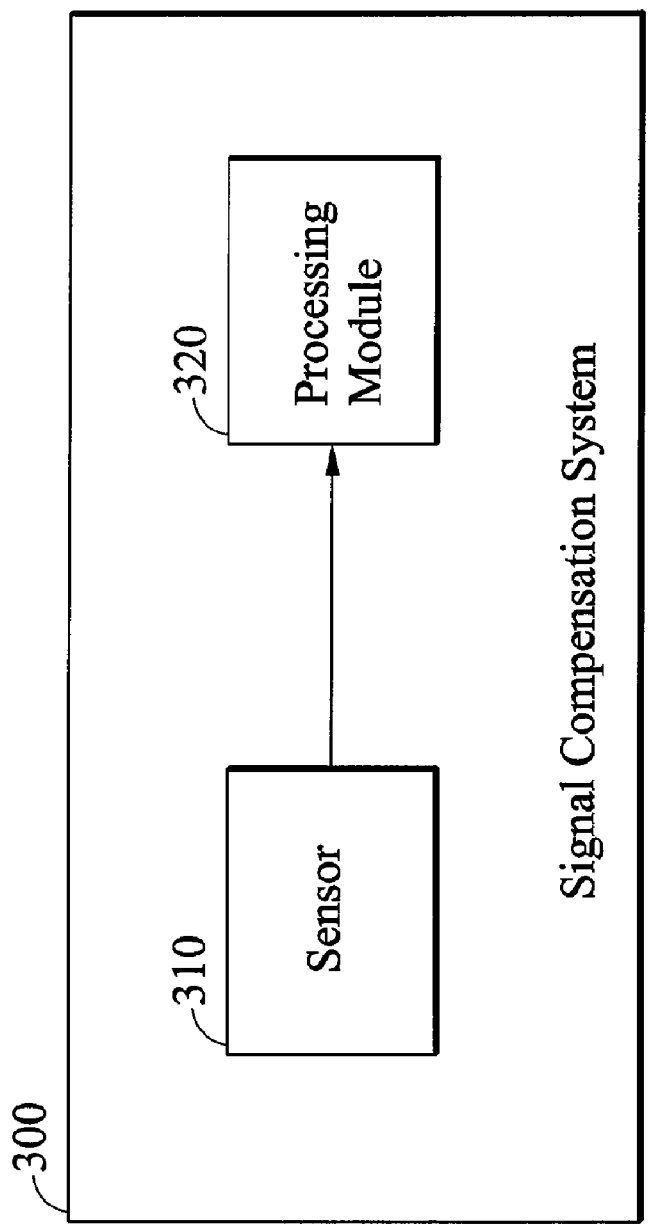
FIG. 3 is a schematic diagram illustrating an embodiment of a signal compensation system.

FIG. 3 is a schematic diagram illustrating an embodiment of a signal compensation system.

The signal compensation system may be a camera device, such as a digital camera, or related devices requiring signal compensation for temperature drift. As shown in FIG. 3, the signal compensation system 300 comprises a sensor 310 and a processing module 320.

The sensor 310 may be of any type, such as a tilt sensor, a position sensor, or a level sensor. The tilt sensor may be a gyro sensor set in the camera device, detecting angle variations of movements of the camera device to generate corresponding sensed signals. The sensed signals of the tilt sensor are angle variations, angular velocity variation, and angular acceleration variation under time. The position sensor may be a Hall effect sensor, detecting position variations of movements of the camera device to generate corresponding sensed signals. The sensed signals of the position sensor are position variations, velocity variation, and acceleration variation under time. The level sensor detects an angle of a plane where the sensor is located to generate corresponding sensed signals. It is understood that an angular velocity sensor is used an example for description in this embodiment.

The processing module 320 sets a noise level of the signal compensation system 300 in advance. The processing module 320 receives sensed signals from the sensor 310, and samples the sensed signals using a predetermined frequency to obtain a plurality of sensed values of the sensed signals. The processing module 320 compares the sensed values to acquire a relative maximum value and a relative minimum value in the sensed values. The processing module 320 determines whether the sensed signals drift according to the noise level, and the relative maximum value and relative minimum value in the sensed values, and compensates the sensed signals accordingly. A detail of the processing module 320 is discussed later.

Figure 4:
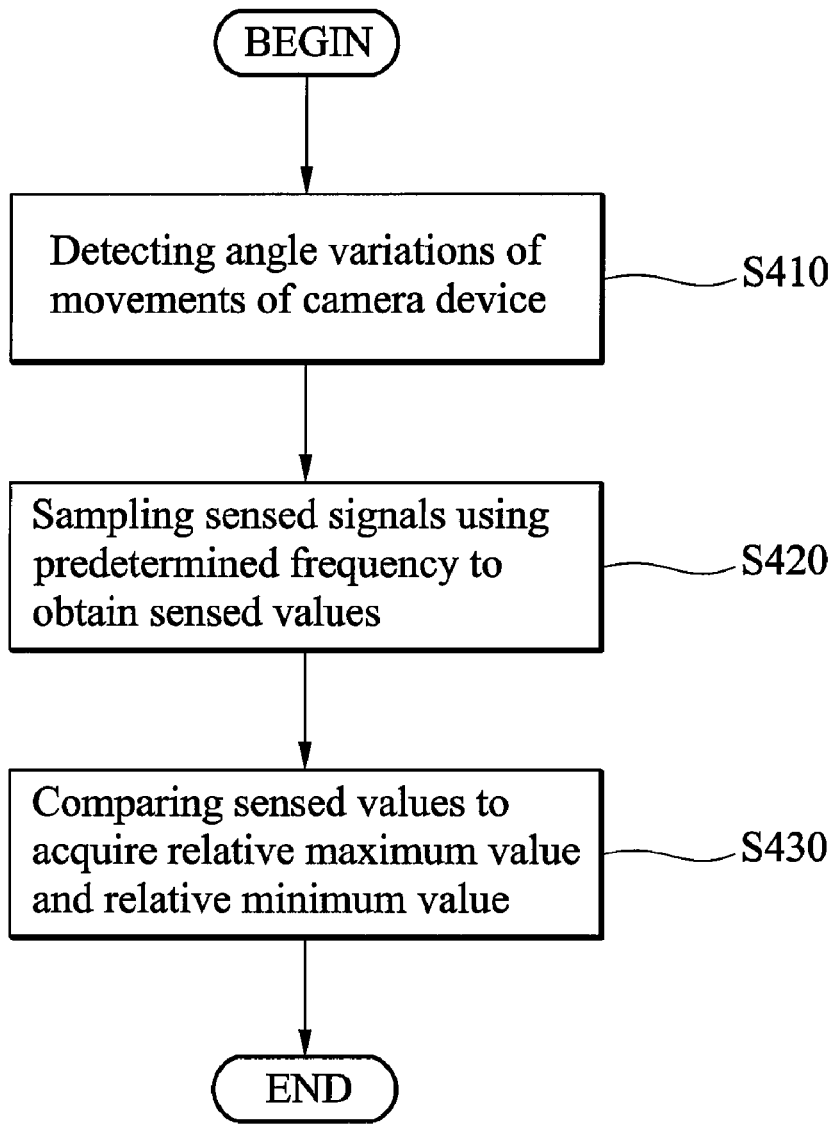
FIG. 4 is a flowchart of an embodiment of a sensed signal sampling method.

FIG. 4 is a flowchart of an embodiment of a sensed signal sampling method.

Figure 5:
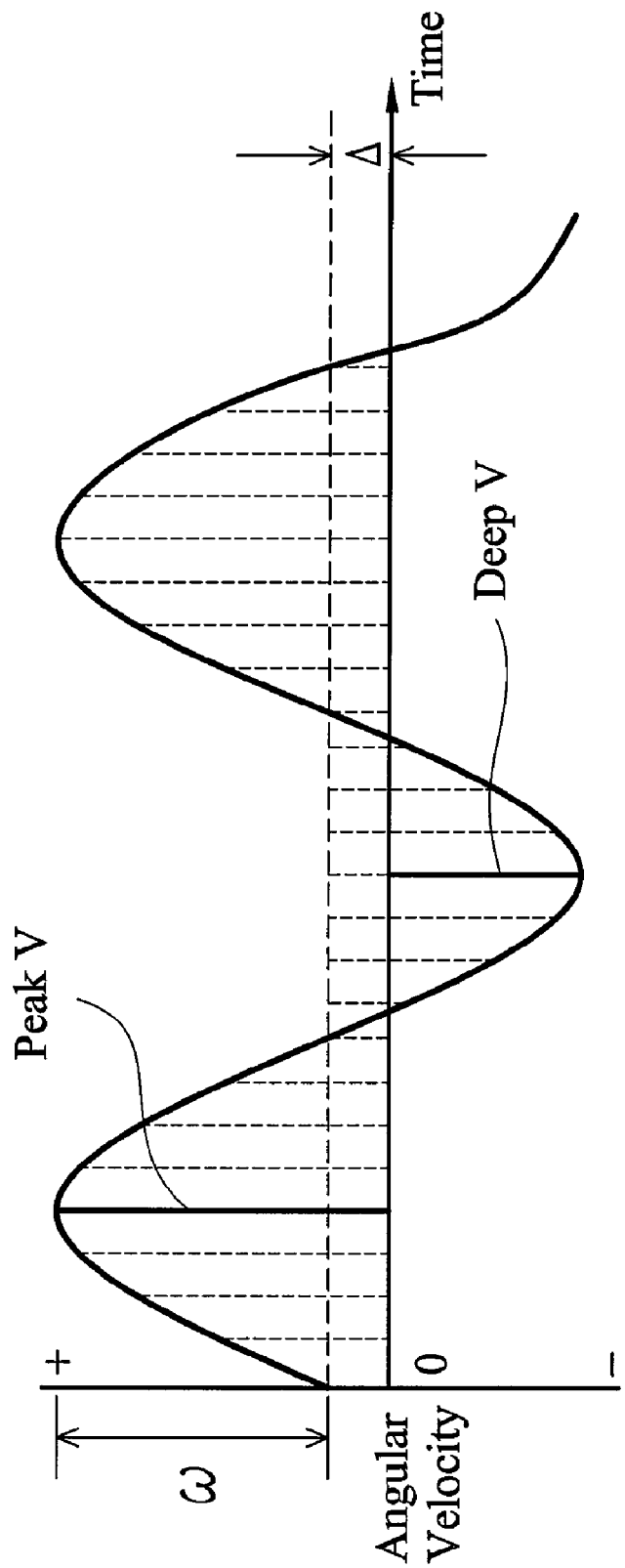
FIG. 5 is a schematic diagram illustrating an embodiment of sampling for sensed values.

In step S410, the angular velocity sensor continuously detects angle variations of movements of a camera device to generate sensed signals. In step S420, the sensed signals are sampled using a predetermined frequency to obtain a plurality of sensed values of the sensed signals at different sample points, where each dotted line represents a sample point, as shown in FIG. 5. In step S430, the sensed values are compared to acquire a relative maximum value and a relative minimum value in the sensed values.

Figure 6:
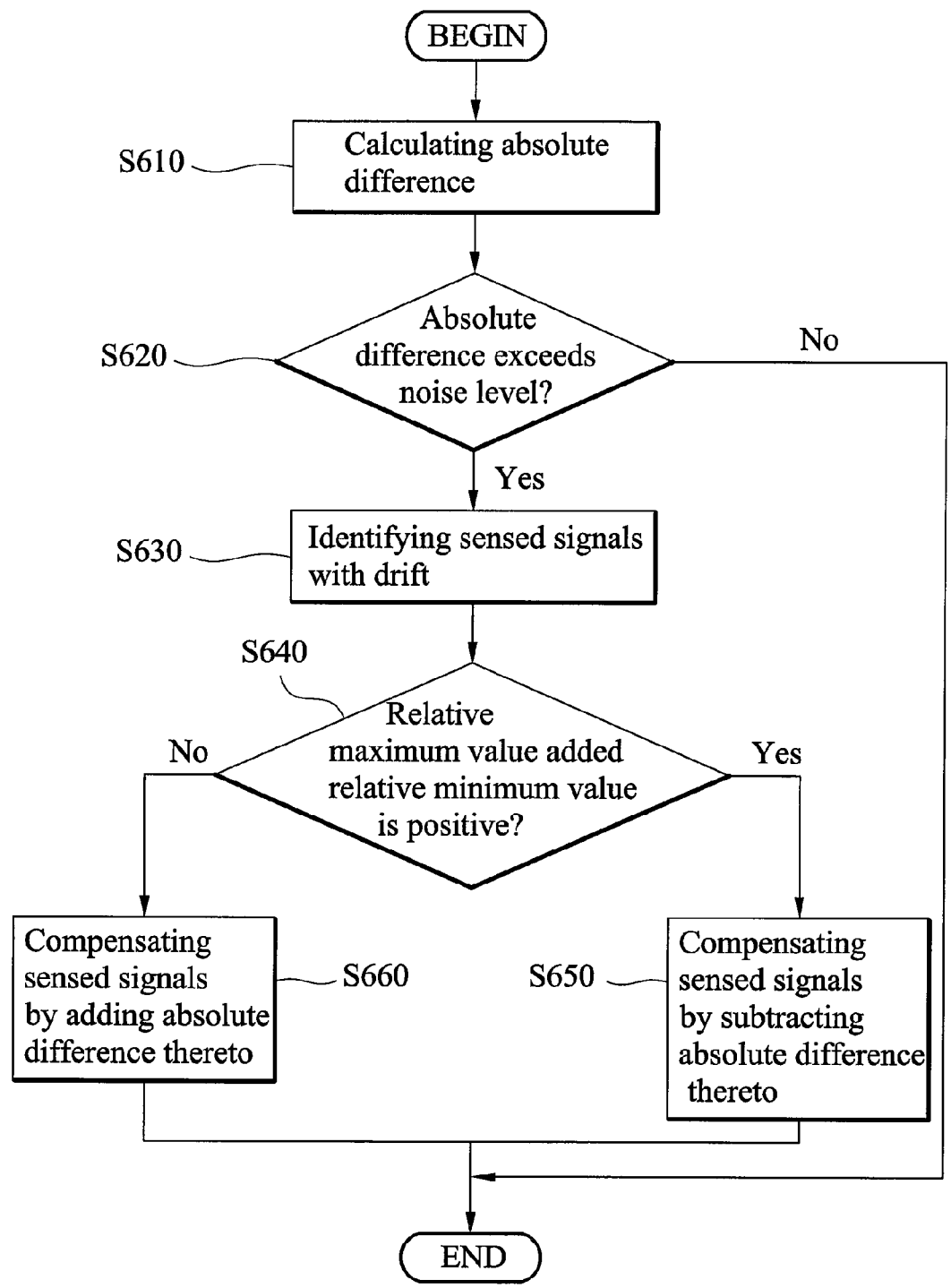
FIG. 6 is a flowchart of an embodiment of a signal compensation method.

FIG. 6 is a flowchart of an embodiment of a signal compensation method.

In step S610, an absolute difference is calculated according to the relative maximum value added the relative minimum value in the sensed values. The absolute difference is the absolute value of the relative maximum value added the relative minimum value. The absolute difference is calculated as:

$$\Delta = |(Peak\ V.) + (Deep\ V.)|,$$

where $\Delta$ is the absolute difference, Peak V. is the relative maximum value in the sensed values, and Deep V. is the relative minimum value in the sensed values.

In step S620, it is determined whether the absolute difference exceeds a predetermined value such as the noise level of the signal compensation system. If not, the sensed signals are identified without a drift, and the procedure is complete. If so, in step S630, the sensed signals are identified with a drift. In step S640, it is determined whether the relative maximum value added the relative minimum value is positive. If so, in step S650, the sensed signals (sensed values) are compensated by subtracting the absolute difference thereto. If the relative maximum value added the relative minimum value is negative, in step S660, the sensed signals (sensed values) are compensated by adding the absolute difference thereto.

Therefore, the present invention provides signal compensation systems and methods that determine whether sensed signals drift under the influence of device noises, and compensate correspondingly, thus ensuring the accuracy of sensors.

Signal compensation systems and methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those who are skilled in this technology can still make various alterations and modifications without departing from the scope and spirit of this invention. Thus, the scope of the invention shall be defined and protected by the following claims and their equivalents.

What is claimed is:

1. A signal compensation system, comprising:
   a sensor detecting movements of a camera device and generating sensed signals; and
   a processing module acquiring a relative maximum value and a relative minimum value of the sensed signals, calculating an absolute difference according to the relative maximum value and the relative minimum value, determining whether the absolute difference exceeds a predetermined value, and if so, identifying whether the sensed signals have a drift, and compensating the sensed signals according to the absolute difference,
   wherein the processing module further determines whether the relative maximum value added to the relative minimum value is positive or negative, compensates the sensed signals by subtracting the absolute difference therefrom when the relative maximum value added the relative minimum value is positive, and compensates the sensed signals by adding the absolute difference thereto when the relative maximum value added the relative minimum value is negative.

2. The system of claim 1 wherein the absolute difference is the absolute value of the relative maximum value added the relative minimum value.

3. The system of claim 1 wherein the processing module further samples the sensed signals using a predetermined frequency to obtain a plurality of sensed values of the sensed signals, and compares the sensed values to obtain the relative maximum value and the relative minimum value.

4. The system of claim 1 wherein the predetermined value is a noise level of the camera device.

5. The system of claim 1 wherein the sensor comprises a tilt sensor.

6. The system of claim 5 wherein the tilt sensor comprises a gyro sensor.

7. The system of claim 1 wherein the sensed signals comprise angle, angular velocity, or angular acceleration signals.

8. The system of claim 1 wherein the sensed signals comprise position, velocity, or acceleration signals.

9. A signal compensation method, comprising:
   obtaining sensed signals, in which the sensed signal indicates movements of a camera device;
   acquiring a relative maximum value and a relative minimum value of the sensed signals;
   calculating an absolute difference according to the relative maximum value and the relative minimum value;
   determining whether the absolute difference exceeds a predetermined value; and
   if so, identifying whether the sensed signals have a drift, and compensating the sensed signals according to the absolute difference,
   wherein the sensed signals is compensated by the steps of:
   determining whether the relative maximum value added to the relative minimum value is positive or negative;
   compensating the sensed signals by subtracting the absolute difference therefrom when the relative maximum value added to the relative minimum value is positive; and
   compensating the sensed signals by adding the absolute difference thereto when the relative maximum value added to the relative minimum value is negative.

10. The method of claim 9 wherein the absolute difference is the absolute value of the relative maximum value added the relative minimum value.

11. The method of claim 9 further comprising:
   sampling the sensed signals using a predetermined frequency to obtain a plurality of sensed values of the sensed signals; and comparing the sensed values to obtain the relative maximum value and the relative minimum value.

12. The method of claim 9 wherein the predetermined value is a noise level of the camera device.

13. The method of claim 9 wherein the sensed signals comprise angle, angular velocity, or angular acceleration signals.

14. A signal compensation method, comprising:
obtaining sensed signals;
acquiring a relative maximum value and a relative minimum value of the sensed signals;
calculating an absolute difference according to the relative maximum value and the relative minimum value;
determining whether the absolute difference exceeds a predetermined value; and
if so, identifying whether the sensed signals have a drift, and compensating the sensed signals according to the absolute difference,
wherein the sensed signals is compensated by the steps of:
determining whether the relative maximum value added the relative minimum value is positive or negative;
compensating the sensed signals by subtracting the absolute difference thereto when the relative maximum value added to the relative minimum value is positive; and
compensating the sensed signals by adding the absolute difference thereto when the relative maximum value added the relative minimum value is negative.

15. The method of claim 14 wherein the absolute difference is the absolute value of the relative maximum value added the relative minimum value.

16. A signal compensation system, comprising:
a sensor detecting movements of a camera device to generate sensed signals; and
a processing module acquiring a relative maximum value and a relative minimum value of the sensed signals, calculating an absolute difference according to the relative maximum value and the relative minimum value, in which the absolute difference is the absolute value of the relative maximum value added the relative minimum value, determining whether the absolute difference exceeds a predetermined value, and if so, identifying the sensed signals have a drift, and compensating the sensed signals according to the absolute difference,
wherein the processing module further determines whether the relative maximum value added the relative minimum value is positive or negative, compensates the sensed signals by subtracting the absolute difference thereto when the relative maximum value added the relative minimum value is positive, and compensates the sensed signals by adding the absolute difference thereto when the relative maximum value added to the relative minimum value is negative.

* * * * *